(12) United States Patent
Kitayama

(10) Patent No.: US 7,865,978 B2
(45) Date of Patent: Jan. 11, 2011

(54) EYEMASK

(75) Inventor: Hidehiro Kitayama, Tokyo (JP)

(73) Assignee: Nawari Trading Co., Ltd., Tokyo (JP)

( * ) Notice: Subject to any disclaimer, the term of this patent is extended or adjusted under 35 U.S.C. 154(b) by 0 days.

(21) Appl. No.: 12/229,738

(22) Filed: Aug. 26, 2008

(65) Prior Publication Data

US 2010/0053542 A1    Mar. 4, 2010

(51) Int. Cl.
*A61F 9/02* (2006.01)

(52) U.S. Cl. ............................................. 2/440

(58) Field of Classification Search ............... 2/9, 2/12, 15, 440; 128/858; 351/41
See application file for complete search history.

(56) References Cited

U.S. PATENT DOCUMENTS

| | | | | |
|---|---|---|---|---|
| 1,743,510 | A | * | 1/1930 | Zickmantel ............ 2/15 |
| 2,169,075 | A | * | 8/1939 | Shyer ............... 2/12 |
| 4,162,542 | A | * | 7/1979 | Frank ............... 2/15 |
| 6,578,578 | B2 | * | 6/2003 | Luquire ............ 128/857 |
| 2006/0139568 | A1 | * | 6/2006 | Kitayama .......... 351/46 |

FOREIGN PATENT DOCUMENTS

JP    2004-8736    1/2004

\* cited by examiner

*Primary Examiner*—Katherine Moran
(74) *Attorney, Agent, or Firm*—Bucknam and Archer

(57) ABSTRACT

An eyemask is formed in such a structure that the protuberance shape of the coupling section (1A) of the first and second eyemask sections (2, 3) connected by the coupling section (1A) is made bigger, and that the light stopping walls (16) are formed on the planar inner face sections (6A) while the nose supporting plates (17) are formed on the annular rim sections (6) thus preventing the eyemask from shifting out of the nose (20) and achieving the light shielding effect.

4 Claims, 3 Drawing Sheets

A-A sectional view

B-B sectional view

EYEMASK

BACKGROUND OF THE INVENTION

1. Field of the Invention

This invention relates to an eyemask, particularly to an improved eyemask in which a coupling section between eyemask sections is made to project forward sufficiently so as not to cause the sliding-down of the eyemask from the nose, and in which nose supporting plates are provided on annular rim sections so as not to cause the sliding-down of the eyemask from the wearer's nose. Additionally, light stopping walls are provided in the outside inner faces of either of the first and the second eyemask sections so that its capability of installation on the human face is raised and the cost-down effectiveness by integral molding is achieved.

2. Brief Description of the Prior Art

Conventionally, one of the abovementioned eyemask of this type, for example, is disclosed in laid-open Japanese Patent Publication No. 2004-8736.

In other words, light stopping walls are not provided on the outside inner faces of a pair of eyemask sections, and the coupling section connecting the eyemask sections is also formed into a protuberance with a small projecting extent. Further, the prevention of sliding-down of the eyemask from the nose by using circular rim sections is void.

SUMMARY OF THE INVENTION

The conventional eyemask constructed as above has the problems presented as below.

The protuberance of the coupling section connecting each eyemask section is a small projection. In cases where this eyemask is normally used and the eyemask is pulled down to watch outside with naked eyes, the stopping of the eyemask on the nose doesn't function well with the result of causing inconvenience in use.

Further, the outside inner face of each eyemask section is merely flat, the light came from outside can easily enter from the corner portions of the eyes, thus causing the disadvantage of dazzling.

Further, the flat portion of the outside inner face of each eyemask section is very small so that the capability of the eyemask mounting on the face is inadequate. This will cause the invasion of outside light into the interior.

The eyemask of the present invention comprises: a first and a second eyemask section each connected by a coupling section and having a plurality of pin holes, temple sections connected to the first and the second eyemask sections respectively, in which the eyemask has a pair of light stopping walls formed in the outside inner face of the first and second eyemask sections and projecting in the rearward direction, a pair of nose supporting plates (17) formed on annular rim sections which are formed on inside inner faces of said first and second eyemask sections (2, 3) and project in a rearward direction respectively, the coupling section forming protuberance shape and projecting in the forward direction. Further, the projecting height H from each end of the coupling section is at least ½ of the interval D1 between the ends of the coupling section. Furthermore, the planar inner face sections which are C-shaped as a whole and communicate with each light stopping wall are formed on the outside inner face of the first and second eyemask sections respectively. Furthermore, the above first and second eyemask sections, the coupling section, the light stopping walls, the nose supporting plates and the planar inner face sections are integrally formed of resin.

According to the eyemask of the present invention constructed as above, the following effects are obtainable.

As the projecting height of the protuberance shape of the coupling section from of its two ends is at least ½ of the interval between the two ends, the engagement between the coupling section and the nose is excellent. In cases where this eyemask is normally used and the eyemask is pulled down, the coupling section will not slide down along the shape of the nose so that excellent mounting capability can be obtained.

Furthermore, as the planar inner face sections and the light stopping walls are formed on the outside inner face of the eyemask sections, the capability of mounting on the face is excellent and the incidence of light came from outside can be suppressed so that a comfortable light shading state can be obtained.

Furthermore, as the eyemask sections, the coupling section, the light stopping walls, the nose supporting plates and the planar inner face sections are integrally formed of resin, high-precision and cheaper cost of the eyemask can be obtained.

DETAILED DESCRIPTION OF THE PREFERRED EMBODIMENTS

The object of the present invention is to provide an eyemask in which a coupling section between the eyemask sections is made to project forward sufficiently so as not to slide down from nose and in which nose supporting plates (17) are provided. Light stopping walls (16) are each provided on the outside inner face of the eyemask sections respectively for light shading, which not only raise the capability of mounting when mounting the eyemask on the face but also cost-down effect is achieved by integral molding.

Preferred embodiment of the eyemask of the present invention will be described in conjunction with the accompanying drawings as below.

Figure 1:
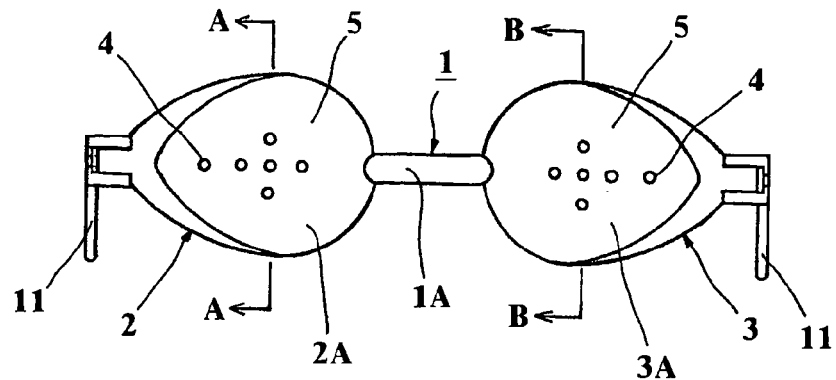
FIG. 1 is a front elevational view showing the eyemask according to the present invention.
Figure 2:
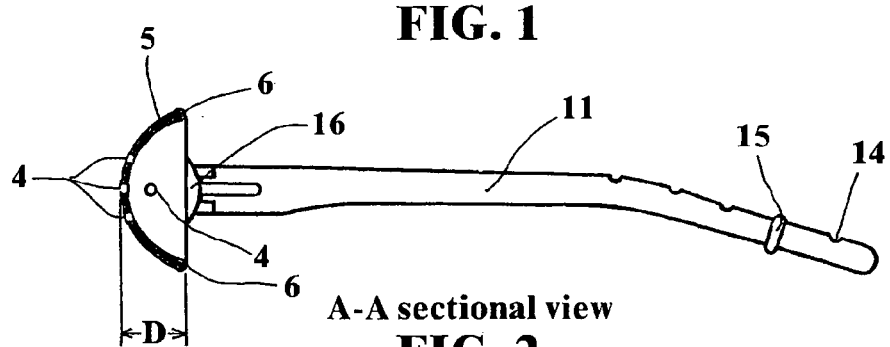
FIG. 2 is a cross-sectional view taken along line A-A of FIG. 1.
Figure 3:
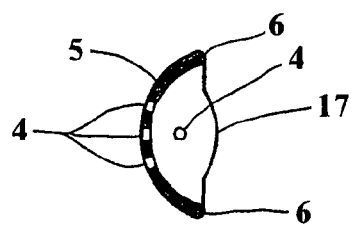
FIG. 3 is a partial cross-sectional view taken along line B-B of FIG. 1.
Figure 4:
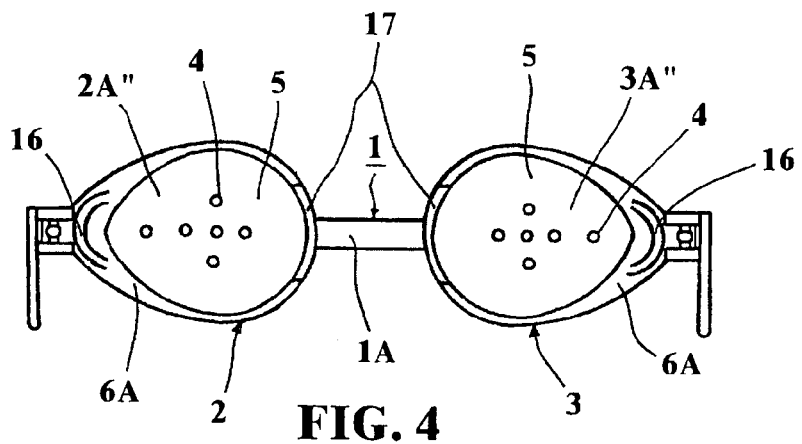
FIG. 4 is a rear elevational view of the eyemask of FIG. 1.

In FIG. 1, the eyemask 1 mainly comprises a first and a second eyemask section 2, 3 each having a projecting hemispherically shaped surface wall 5, a coupling section 1A, a plurality of pin holes 4, convex shape sections 2A, 3A formed on each eyemask sections 2, 3, concave shape sections 2A", 3A", a pair of temple sections 11 provided on the outside of each eyemask sections 2, 3 through hinges 12A disposed within the small holes 12 at the outer ends, and O-rings 15 provided on the temple sections 11.

Figure 5:
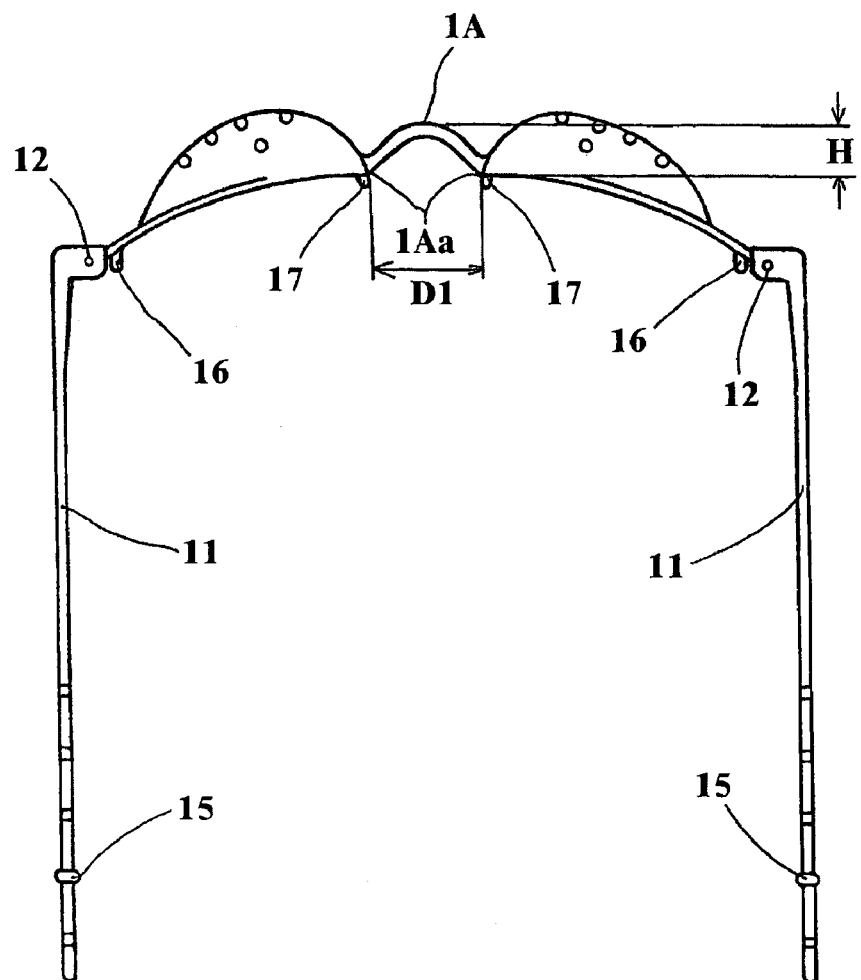
FIG. 5 is a top plan view of the eyemask of FIG. 1.
Figure 6:
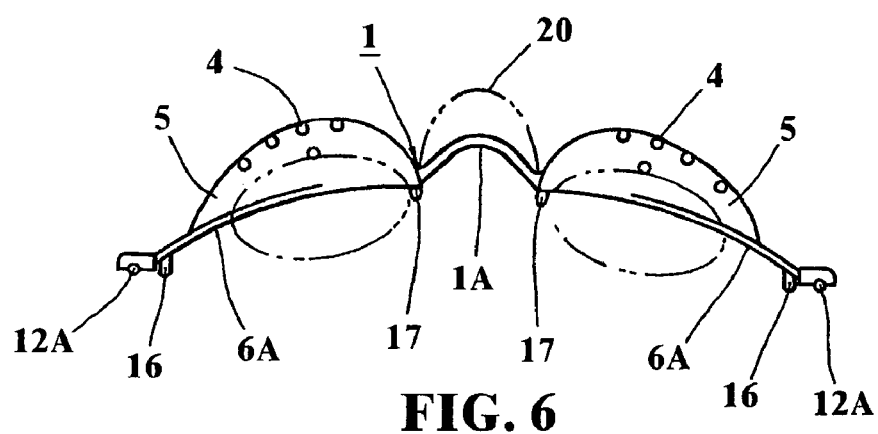
FIG. 6 is a view showing the wearing of the eyemask on the face.
Figure 7:
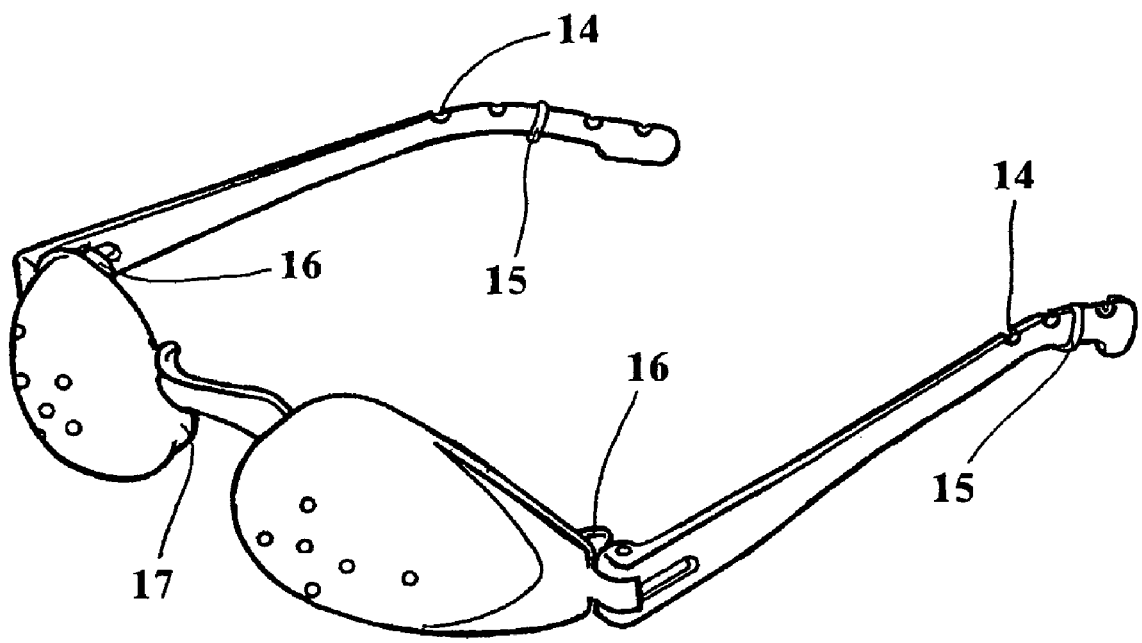
FIG. 7 is a perspective view of the eyemask of FIG. 1.

The coupling section 1A is formed as a protuberance shape remarkably projected forward, comparing with the conventional coupling section 1A. As shown in FIG. 5, the shape of the coupling section 1A is formed in such a manner that its projecting height H is at least ½ of the interval D1 between the ends 1Aa (proved to be excellent within this range). As shown in FIG. 6, the coupling section 1A is formed so as to stop on the nose 20 (shown in phantom).

In other words, in cases of wearing the eyemask 1 on the face and moving the eyemask 1 down, sliding-down can be avoided due to engagement of the coupling section 1A with the nose 20, and sliding-down at the nose supporting plate 17 can be reliably prevented. Furthermore, in case the eyemask 1 is pulled down for a purpose to watch the outside with naked eyes, the coupling section 1A is also in engagement with the nose 20 so as to prevent the eyemask 1 from sliding down.

Further, the O-rings 15 disposed within the grooves 14 at the rear segments of the above temple sections 11 can effectively prevent the eyemask 1 from sliding down when it is worn on the face.

On the annular rim sections 6 formed in the inner face of the eyemask section 2, 3, nose supporting plates 17 are formed on the inside respectively so as to prevent the eyemask 1 from sliding down, and the planar inner face sections 6A of C-shape as a whole are formed on the outside inner face respectively. Light stopping walls 16 connected with the planar inner face sections 6A respectively and projecting in the rearward direction (i.e., an inward direction perpendicular to the above planar inner face sections 6A) are formed on the planar inner face sections 6A.

The eyemask sections 2, 3, the coupling section 1A, the light stopping walls 16, the nose supporting plates 17 are integrally formed of resin. Accordingly, not only the shape size can be precisely finished but also the eyemask 1 can be manufactured at lower cost.

When the eyemask 1 is worn on the face, the ring-shape edge section 6 and the planar inner face section 6A of each eyemask section 2, 3 can be reliably engaged and worn on the face, and the incidence of the light from outside can be avoided by each light stopping wall 16 so as to obtain comfortable wearing state.

Furthermore, as the coupling section 1A is configured as above, the coupling section 1A and the nose supporting plates 17 can be engaged on the nose 20 and the sliding-down of the eyemask 1 are reliably prevented.

While the preferred embodiment has been described as above, it is noted that the preferred embodiments are not restrictive to the scope of implementation of the present invention. Modifications and variations proposed without departing from the scope of the claims of the present invention are considered to be still within the scope of the present invention.

What is claimed is:

1. An eyemask, comprising a first eyemask section and a second eyemask section (2, 3) which are connected by a coupling section (1A) with two ends (1Aa), each of said first and second eyemask sections (2, 3) being provided with a plurality of pin holes (4) and being provided with an outside inner face, said coupling section (1A) being connected to said first and second eyemask sections (2, 3) via said ends (1Aa) respectively; and temple sections (11) hingedly connected to said first and second eyemask sections (2, 3) respectively, wherein said eyemask has a pair of light stopping walls (16) formed on the outside inner faces of said first and second eyemask sections (2, 3) and projecting in a rearward direction respectively, a pair of nose supporting plates (17) which are formed on annular rim sections formed on said first and second eyemask sections (2, 3) and projecting in the rearward direction respectively, and said coupling section (1A) is formed into a protuberance shape and projects in a forward direction, the temple sections (11) are arranged to be aligned with portions of the first and second eyemask sections (2,3), where the pin holes (4) are formed, in a horizontal direction, the light stopping walls (16) are arranged to be aligned with the hinged connection of the temple sections (11) in the horizontal direction, and the nose supporting plates (17) are arranged to be aligned with the portions of the first and second eyemask sections (2, 3), where the pin holes (4) are formed, in the horizontal direction.

2. An eyemask as claimed in claim 1, wherein planar inner face sections (6A) entirely formed in C-shape and communicating with said light stopping walls (16) respectively are formed on said outside inner faces of said first and second eyemask sections (2, 3).

3. An eyemask as claimed in claim 2, wherein said first and second eyemask sections (2, 3), said coupling section (1A), said light stopping walls (16), said planar inner face sections (6A), and said nose supporting plates (17) are integrally formed of resin.

4. An eyemask as claimed in claim 1, wherein said coupling section (1A) projects from said ends (1Aa) by a height (H) which is at least one half of an interval (D1) between said ends (1Aa).

* * * * *